(12) United States Patent
Christ

(10) Patent No.: US 8,047,740 B2
(45) Date of Patent: Nov. 1, 2011

(54) FRICTION-WELDED CONNECTION BETWEEN A SHEET METAL ELEMENT AND A ROTATION BODY

(75) Inventor: Eberhard Christ, Tambach-Dietharz (DE)

(73) Assignee: EJOT GmbH & Co. KG, Bad Laasphe (DE)

( * ) Notice: Subject to any disclaimer, the term of this patent is extended or adjusted under 35 U.S.C. 154(b) by 158 days.

(21) Appl. No.: 11/791,331

(22) PCT Filed: Dec. 7, 2005

(86) PCT No.: PCT/EP2005/013108
§ 371 (c)(1),
(2), (4) Date: Jul. 27, 2007

(87) PCT Pub. No.: WO2006/061203
PCT Pub. Date: Jun. 15, 2006

(65) Prior Publication Data
US 2008/0101857 A1    May 1, 2008

(30) Foreign Application Priority Data
Dec. 10, 2004 (DE) .................. 10 2004 059 625 U

(51) Int. Cl.
*F16L 13/02* (2006.01)
(52) U.S. Cl. ......... 403/270; 403/280; 403/282; 411/171
(58) Field of Classification Search .......... 403/269–271, 403/280, 282; 411/171, 386, 387.1; 228/2.1, 228/2.3, 112.1, 114.5
See application file for complete search history.

(56) References Cited

U.S. PATENT DOCUMENTS

| | | | |
|---|---|---|---|
| 5,492,264 A * | 2/1996 | Wadleigh | 228/112.1 |
| 6,067,839 A | 5/2000 | Xie | |
| 6,238,121 B1 * | 5/2001 | Roser | 403/13 |
| 6,460,750 B1 * | 10/2002 | Coletta et al. | 228/2.1 |
| 6,641,229 B1 * | 11/2003 | Kosak | 301/132 |
| 2002/0121259 A1 * | 9/2002 | Mizutani | 123/188.8 |
| 2002/0125297 A1 * | 9/2002 | Stol et al. | 228/112.1 |
| 2003/0012619 A1 * | 1/2003 | O'Banion | 411/171 |
| 2003/0012620 A1 * | 1/2003 | O'Banion et al. | 411/386 |
| 2005/0025564 A1 * | 2/2005 | Humpert et al. | 403/282 |
| 2006/0096091 A1 * | 5/2006 | Carrier | 29/889.2 |

(Continued)

FOREIGN PATENT DOCUMENTS
AU    2005-263581 A    1/2006
(Continued)

OTHER PUBLICATIONS

Schober D, Reibschweissen von Metallen, p. 67.

*Primary Examiner* — Joshua Kennedy
(74) *Attorney, Agent, or Firm* — Birch, Stewart, Kolasch & Birch, LLP

(57) ABSTRACT

Friction-welded connection between a sheet metal element and a therein inserted rotation body. The sheet metal element is provided with a protruding, circular annular wall as a pressure face, which pressure face is adapted to be engaged by the rotation body with a counter-pressure face. At least one pressure face is of such conicity that the insertion of the rotation body loads the annular wall with increasing pressure, there being formed a friction-welded connection between rotation body and annular wall as a result of rotation of the rotation body.

3 Claims, 2 Drawing Sheets

U.S. PATENT DOCUMENTS

| | | | |
|---|---|---|---|
| 2007/0190859 A1* | 8/2007 | Christ et al. | 439/610 |
| 2008/0101857 A1 | 5/2008 | Christ | |
| 2008/0253829 A1* | 10/2008 | Birkelbach | 403/14 |
| 2009/0041539 A1* | 2/2009 | Swallow et al. | 403/272 |

FOREIGN PATENT DOCUMENTS

| | | |
|---|---|---|
| DE | 100 12 782 A1 | 9/2001 |
| DE | 101 25 117 A1 | 5/2002 |
| EP | 0 150 518 A | 8/1985 |
| EP | 0 337 813 A | 10/1989 |
| EP | 0 337 813 A | 10/1989 |
| EP | 1 593 452 A | 11/2005 |
| EP | 1 593 452 A | 11/2005 |
| EP | 1 824 633 B1 | 8/2010 |
| JP | 59-107780 A | 5/1984 |
| JP | 2003-205373 A | 7/2003 |
| JP | 2004-066336 A | 3/2004 |
| WO | WO 2006/008122 A1 | 1/2006 |
| WO | WO-2006/008122 A1 | 1/2006 |

* cited by examiner

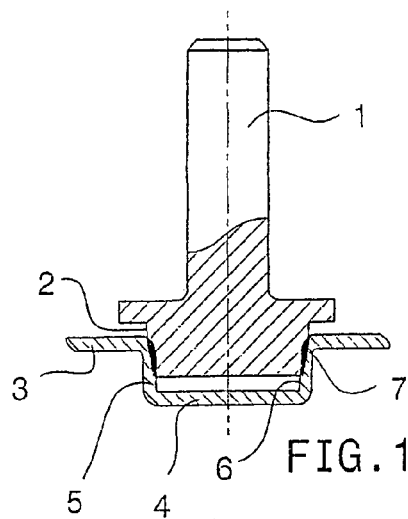
FIG.1
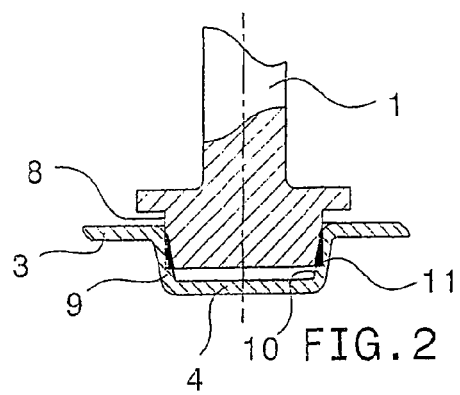
FIG.2
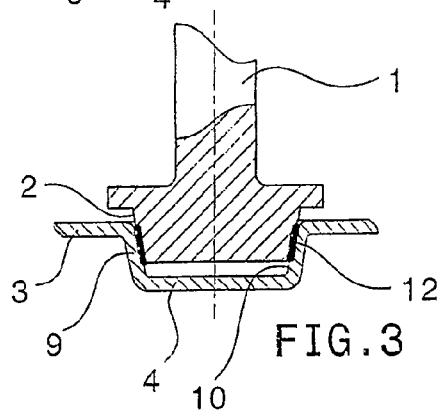
FIG.3
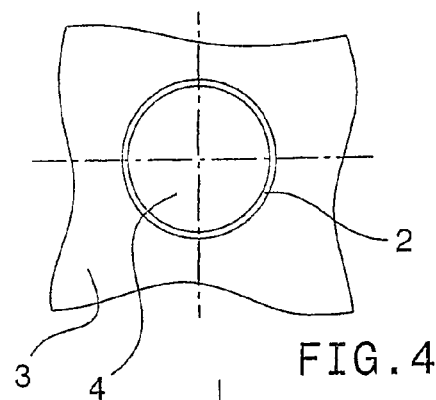
FIG.4
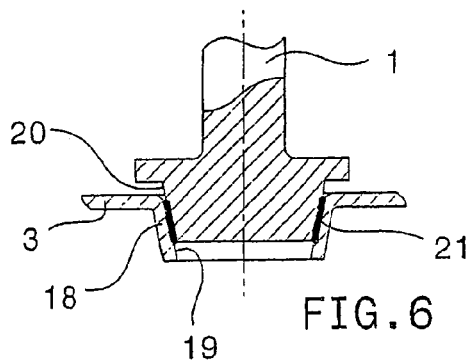
FIG.5
FIG.6
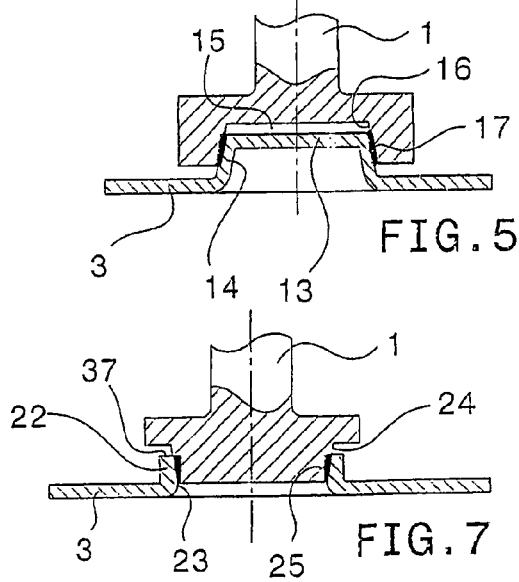
FIG.7
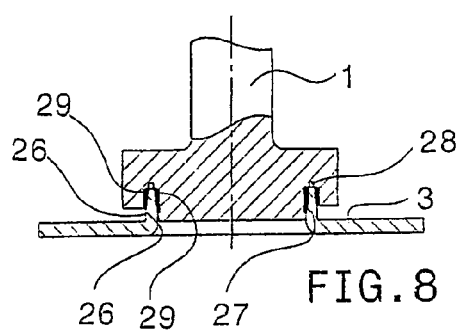
FIG.8
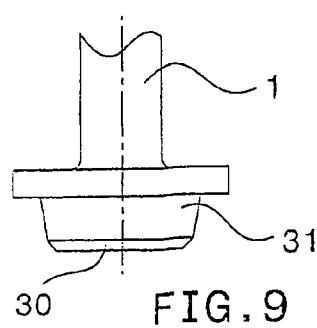
FIG.9

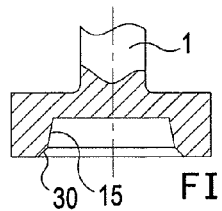
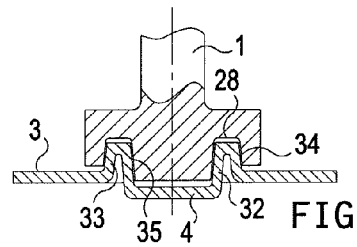
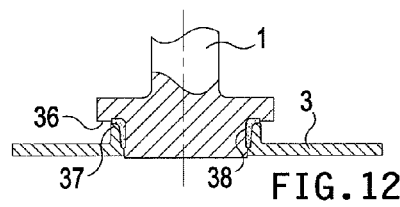
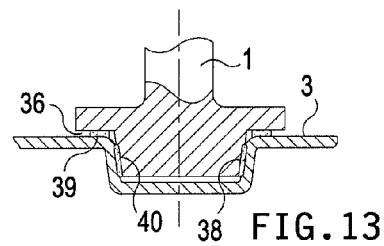
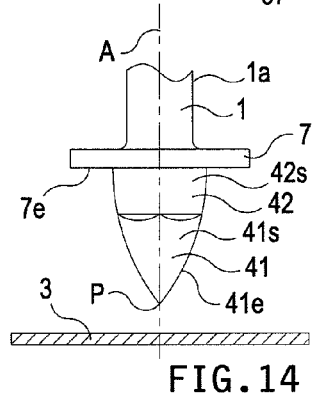
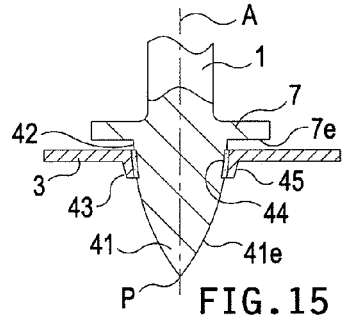
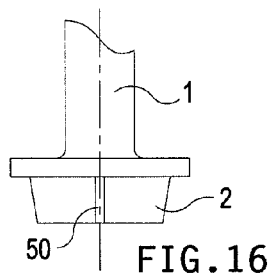
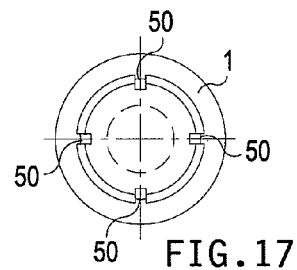
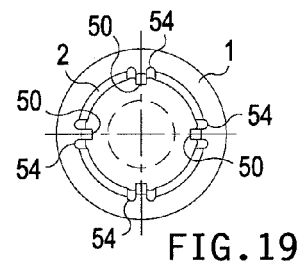
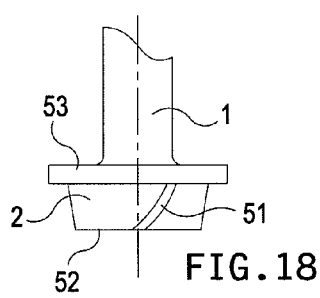
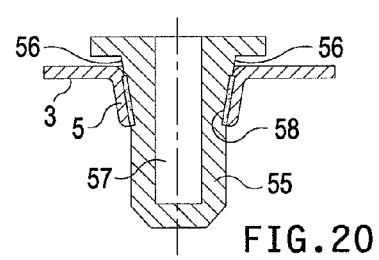

# FRICTION-WELDED CONNECTION BETWEEN A SHEET METAL ELEMENT AND A ROTATION BODY

The invention relates to a friction-welded connection between a sheet metal element and a therein inserted rotation body.

Such a friction-welded connection is presented on page 67 of the book "Reib-schweissen von Metallen" [Friction-Welding of Metals] by Neumann Schober, published in 1991 by Technik Berlin. This relates to a friction-welded connection between a perforated sheet metal element and a rotated stud, wherein the hole in the sheet metal element may be conical or cylindrical and wherein the end of the stud projecting into the hole in the sheet metal element is likewise conical in form. Both the relevant end of the stud and also the hole in the sheet metal element may be of conical design, the cone angle being identical with respect to the two components. As a disadvantage of such a design, it is pointed out that the joining zone, which corresponds to the thickness of the sheet metal element, is relatively small.

Furthermore, DE 199 27 369 A1 and U.S. Pat. No. 4,850,772 both present friction-welded connections between a flat, unperforated sheet metal element and a stud, wherein the friction-welded connection includes the end face of the stud, which end face may, where appropriate, be radially wider than the diameter of the stud.

For its production, a friction-welded connection including a flat, unperforated component requires the relevant stud to be applied with considerable pressure to the sheet metal element while the stud is rotated, this requiring a corresponding resisting force from the sheet metal element so that it does not bow and thus become deformed. Although being diminished in the initially mentioned friction-welded connection between a stud provided with a conical end and a perforated sheet metal element, this effect leads, particularly in the case of thin sheet metals, to the difficulty of opposing sufficient resistance to the stud while the latter is being applied to the sheet metal element, which sufficient resistance cannot be provided by thin sheet metals. Consequently, the production of such a friction-welded connection necessitates the use of a counter-support to support the sheet metal element from the side facing away from the stud.

The object of the invention is to make it possible for the in itself advantageous method of producing a friction-welded connection on a sheet metal element to be advantageously realized in spite of the hereinbefore described difficulties. The object of the invention is achieved in that the sheet metal element is provided with a protruding, circular annular wall as a pressure face, which pressure face is adapted to be engaged by the rotation body with a counter-pressure face, wherein at least one pressure face is of such conicity that the insertion of the rotation body loads the annular wall with increasing pressure, there being formed a friction-welded connection between rotation body and annular wall as a result of rotation of the rotation body.

Protruding out of the sheet metal element, e.g. through punching or stamping, the circular annular wall provides the sheet metal element in the region of the future friction-welded connection with considerably increased stability (compared with the flat sheet metal) to withstand the pressure applied by the rotation body for producing the required heat, this extensively dispensing with the need for a counter-support for supporting the sheet metal element in the region of the future friction-welded connection. Consequently, a sheet metal element provided with such an annular wall is capable, also in the case of relatively thin sheet metal of approx. 0.6 mm thickness, of being exposed, without support from a counter-support, directly to the pressure of the rotation body for forming the friction-welded connection. This is of particular significance particularly in the case of the automated production of large sheet metal elements, such as car bodies, because, in such production, the side facing away from the rotation body application tool is often difficult to access for a counter-support. This problem is remedied through the use of an annular wall, formed out of the sheet metal element, as a constituent part of the required friction-welded connection, since the design according to the invention of the friction-welded connection between a sheet metal element and a rotation body dispenses with the need for a counter-support.

For production of the friction-welded connection, it is possible for either the pressure face or the counter-pressure face alone to be of conical form. Alternatively, however, it is possible for both pressure faces to be of conical form. In any case, it is ensured by the conical form of at least one of the two components forming the friction-welded connection that the application of the rotation body to the sheet metal element and into the aperture thereof gives rise, above all, to considerable radial compressive forces, which are all the greater, the smaller is the angle of the cone, for which it is possible to specify, for example, an angle between 5° and 15°. The use of an annular wall protruding out of the sheet metal element, with at least one of the two components forming the friction-welded connection being of conical form, means that, upon insertion of the rotation body into the aperture in the sheet metal element, there is a particularly high radial force and, therefore, a corresponding radial pressure, without the sheet metal element being unacceptably exposed to bowing.

With regard to the design of the annular wall, it is possible, on the one hand, for said annular wall to be produced in the form of a recess in the sheet metal element or for the annular wall to be formed by a nozzle, it being possible for the recess or the nozzle to be formed either in the insertion direction of the rotation body or opposite to the insertion direction. Required for this purpose is an appropriate punching or stamping tool which in known manner either creates the recess through a deep-drawing operation or produces the nozzle through a punching or stamping operation. Both the recess and also the nozzle may then be of conical form, it being possible, in particular, for the cone angle of the respective annular wall to be adapted to that of the rotation body. In addition, it is possible for the cone of the rotation body to be provided with an entry bevel in order thereby to facilitate the introduction of the rotation body into the aperture in the sheet metal element.

A particularly advantageous design of the recess is achieved if the recess is circularly S-shaped in cross-section with inner and outer annular walls, it being possible for both the inner and outer annular walls to be of conical form. In order to oppose a correspondingly shaped rotation body to such a design of the annular walls, the rotation body is provided on its front side facing the sheet metal element with a circularly extending groove, the walls of which are adapted to the inner and outer annular walls.

In order to improve the friction-welded connection, the rotation body may be provided, radially outwardly, with a substantially flat end face, said end face being included with the front end of the nozzle in the friction-welded connection on the cone. In such a case, the friction-welded connection is not only concentrated on the area of the nozzle, but is also formed beyond the front end thereof.

In order additionally to afford the friction-welded connection a particular degree of leak-tightness, the radially outwardly extending end face of the rotation body is advantageously provided with an adhesive coating to produce a seal between the rotation body and the sheet metal element next to the annular wall, said seal preventing the ingress of moisture into the region of the friction-welded connection and thereby protecting the latter against corrosion.

An advantageous method of fabrication for forming the nozzle is obtained if the rotation body is provided with a drilling tip with an adjoining enlarging cone, wherein the thus formed nozzle forms the friction-welded connection with the friction surface of the rotation body adjacent to the nozzle. In such a case, first the drilling tip with the adjoining enlarging cone is applied to the sheet metal element, whereupon a hole is drilled in the sheet metal element, said hole being subsequently widened by the enlarging cone, there being formed a conical nozzle which then later forms the pressure face of the annular wall for forming the friction-welded connection.

As the rotation body engages the counter-pressure face of the sheet metal element, there may be the undesired accumulation of abraded material, particularly if the sheet metal element consists of a coated, more particularly a paint-coated, sheet metal. Such abraded material is capable of disturbing the friction-welding operation. In order extensively to prevent this, the counter-pressure face of the rotation body may be interrupted by substantially axially extending grooves. Said grooves scrape off any paint and oxide layers and then receive any abraded material and/or dirt particles. In order to ensure the removal of any material collected in the grooves, the grooves may extend at an angle to the axial direction, this then causing the corresponding material particles to be transported either towards the sheet metal element or away therefrom, depending on the inclination of the grooves.

In order to facilitate the removal of any dirt particles abraded during the friction-welding operation, it is possible for beads to be provided on the counter-pressure face next to the grooves. Said beads likewise ensure the quick removal of any dirt particles generated during the friction-welding operation.

The friction-welding body may, apart from the counter-pressure face, be of various design. In particular, it is possible for the rotation body to be disposed at the end of a stem. Alternatively, however, it is possible for the rotation body to be of such design that it is formed by the outer wall of a sleeve. The hole in the sleeve may serve, for example, to receive a screw.

An advantageous application of the hereinbefore presented principle of the joining of rotation body and sheet metal element can further be accomplished in that the junction point of rotation body and sheet metal element is provided with a solder. In such a design, the solder melts at relatively low temperature and then joins together the two components, namely the counter-pressure face of the rotation body and the sheet metal element, this in principle likewise constituting a type of friction-welded connection, albeit one in which the welding operation is confined to the material of the solder.

Illustrative embodiments of the invention are presented in the drawings, in which:

FIG. 1 shows the sheet metal element, provided with a cylindrical recess, together with a conical rotation body;

FIG. 2 shows the sheet metal element, provided with a conical recess, together with a cylindrical rotation body;

FIG. 3 shows the sheet metal element, provided with a conical recess, together with a conical rotation body;

FIG. 4 shows the sheet metal element from FIG. 3 without rotation body in order to illustrate the circular form of the conical annular wall of the recess;

FIG. 5 shows a conical recess opposite to the insertion direction of the conical rotation body;

FIG. 6 shows a sheet metal element with a conical nozzle and a conical rotation body, wherein the nozzle protrudes out of the sheet metal element in the insertion direction of the rotation body;

FIG. 7 shows a sheet metal element with a nozzle extending opposite to the insertion direction of the conical rotation body;

FIG. 8 shows a sheet metal element with a nozzle extending perpendicularly and opposite to the insertion direction of the rotation body, wherein provided on the nozzle is a rotation body with a corresponding circularly extending, conical groove;

FIGS. 9 and 10 show rotation bodies with entry bevels;

FIG. 11 shows a sheet metal element with an S-shaped recess and correspondingly designed rotation body;

FIG. 12 shows a sheet metal element with a nozzle extending opposite to the insertion direction of the rotation body and with a friction-welded connection extending to above the front end of the nozzle;

FIG. 13 shows a sheet metal element with a recess and with an inserted rotation body, the radially outwardly extending end face of which rotation body is provided with a layer of self-adhesive;

FIGS. 14 and 15 show the use of a drilling tip with an adjoining enlarging cone for producing a nozzle in the insertion direction of the rotation body;

FIG. 16 shows a counter-pressure face of the rotation body, said counter-pressure face being provided with axial grooves;

FIG. 17 shows a top plan view of the design according to FIG. 16;

FIG. 18 shows the counter-pressure face of a rotation body with obliquely extending grooves;

FIG. 19 shows the top plan view of the rotation body with grooves in the counter-pressure face and with adjacent beads; and FIG. 20 shows a rotation body in the form of a sleeve.

The friction-welded connection presented in FIG. 1 consists of the rotation body 1 with the conical counter-pressure face 2, said counter-pressure face 2 having been pressed into the sheet metal element 3 with the recess 4, the counter-pressure face 2 being pressed against the circular, substantially cylindrical annular wall 5 of the recess 4. Owing to the conical form of the counter-pressure face 2, upon insertion of the rotation body 1 with its counter-pressure face 2, a high pressure is exerted on the pressure face 6 of the recess 4, which, given appropriately fast rotation of the rotation body 1, results in the softening of the surface of the pressure face 6, this giving rise finally to the friction-welded connection, indicated by the black area 7. Since, in cases where the friction-welded connection 7 is thus produced, there is essentially a radial pressure, originating from the counter-pressure face 6, on the pressure face 6, and on account of the stability afforded to the sheet metal element 3 by the recess in the sheet metal element 3, there is no need, for the production of such a friction-welded connection 7, to resort to the use of a counter-support, despite the high pressure that is exerted by the rotation body 1 on the sheet metal element 3. In this manner, the rotation body 1 is securely and permanently fixed to the sheet metal element by means of the friction-welded connection, said rotation body 1 then being able to serve to attach any further components, as is known, for example, from the use of welding studs which are arc-welded to vehicle body panels.

FIG. 2 presents, as it were, a converse design to that shown in FIG. 1. In FIG. 2, the rotation body 1 has a substantially cylindrical counter-pressure face 8 which presses against the conical, circular annular wall 9 of the recess 4, more specifically against the pressure face 10 of the rotation body 1, wherein, for this purpose, said pressure face 10 is here of conical form, the resulting friction-welded connection once again being indicated by the black area 11. The occurring radial forces are essentially identical to those that occur in the design according to FIG. 1.

FIG. 3 presents a variation on the designs according to FIGS. 1 and 2, both the counter-pressure face 2 of the rotation body 1 and also the pressure face 10 of the recess 4 being conical in form. In such a design, from the instant in which the rotation body 1 begins to be pressed into the recess 4, the counter-pressure face 2 of the rotation body 1 adapts to the pressure face 10 of the conical annular wall 9, with the consequence that, upon introduction of the rotation body 1 into the recess 4, there is immediately produced intensive friction over the entire length of pressure face 2 and counter-pressure face 10. The ensuing friction-welded connection is indicated by the black area 12 in the region between pressure face 9 and counter-pressure face 10.

FIG. 4 illustrates the circular design of the annular wall 9, more particularly the circular form thereof.

The design according to FIG. 5 comprises a sheet metal element 3 with a recess 13 extending opposite to the insertion direction of the rotation body, wherein, in this case, the recess 13 is embraced on the outside by the rotation body 1. For this purpose, the here conical annular wall 14 of the recess 13 is opposite to the internal cone 15 of the rotation body 1, the counter-pressure face 16 of the rotation body 1 embracing the here likewise conical annular wall 14. Since, in this design, both the annular wall 14 with its pressure face 15 and also the conically formed counter-pressure face 16 are pressed against each other, this immediately results over a large length in a corresponding pressure and, therefore, in heating at the contact surfaces, said heating then giving rise to the friction-welded connection 17, which is represented by the black area.

A design similar to the one shown in FIG. 5 is presented in FIG. 6, in which a nozzle 18 is formed in the sheet metal element 3 with the conical annular wall 19, into which annular wall 19 has been pressed the rotation body 1 with its conical counter-pressure face 20, this then being represented by the black area 21 in FIG. 6.

FIG. 7 presents the sheet metal element 3 with the nozzle extending opposite to the insertion direction of the rotation body 1, the annular wall 23 extending approximately perpendicularly out of the sheet metal element 3 towards the advancing rotation body 1, wherein said rotation body 1 exerts, with its conical counter-pressure face 24, the considerable radial pressure on the annular wall 23, this ultimately giving rise to the friction-welded connection 25, which is represented by the black area.

FIG. 8 presents a variation on the design of the friction-welded connection in which there is provided a nozzle 27 with an annular wall 26 extending approximately perpendicularly away from the sheet metal element 3, said annular wall 26 here forming a nozzle 27 opposite to the insertion direction of the rotation body 1, the annular wall 26 circularly penetrating a corresponding groove 28 in the rotation body 1, wherein, on account of the conicity of said groove 28, the annular wall 26 is compressed and produces the requisite heating when the rotation body 1 is rotated. In this design, the black area 29 once again represents the formation of friction-welded connections, which, in this case, refer to the two sides of the circular friction-welded connection.

FIGS. 9 and 10 present two rotation bodies, each provided with an entry bevel 30. The design according to FIG. 9 is presented with the projection 31, which can be pressed, for example, into the recess 4 in FIG. 3 or into the annular wall 23 in FIG. 7. The same applies to the design presented in FIG. 10, which, so to speak, can be pressed onto an annular wall, as was already explained in connection with FIG. 5. In both the embodiments presented in FIG. 9 and FIG. 10, the entry bevel 30 ensures that there is proper guiding during the respective insertion of the rotation body into the corresponding mating component.

A design similar to the one in FIG. 8 is presented in FIG. 11, in which merely the recess 4 transitions in S-shaped form into an inner annular wall 32 and an outer annular wall 33, this providing the rotation body 1 with a contact surface similar to that in the design presented in FIG. 8, in which, therefore, the inner and outer annular walls 32/33 are enclosed by the walls of a circular groove 28 and then result in the friction-welded connections 34 and 35, which are represented in black.

According to FIG. 12, an end face 36 on the rotation body 1 is used also to include in the friction-welded connection the end face of the annular wall 37 originating from the nozzle, because, namely, upon insertion of the rotation body 1 into the region inside the annular wall 37, the end face 36 also comes up against the end face of said annular wall, thereby automatically including said end face in the friction-welded connection. Once again, the friction-welded connection is here represented by the black area 36 in FIG. 12.

The radially outwardly directed, flat end face of the rotation body 1 can, according to FIG. 13, also be used to ensure, if provided with an adhesive coating 39, that the friction-welded connection 38, represented by the black area 40, is especially leak-tight. For this purpose, the end face 36 is provided with an adhesive coating 39, which, upon formation of the friction-welded connection 38, is then pressed against the sheet metal element 3, effecting at that point a leak-tight seal around the friction-welded connection 38.

FIGS. 14 and 15 present the formation of a nozzle with subsequent friction-welded connection 44, wherein a rotation body 1 includes a stem portion 1a, a flange portion 7 extending radially from a distal end of the stem portion 1a, and an enlarging portion 42 shaped as a truncated cone, and a drilling tip 41 disposed one after the other along an axis of rotation A of the rotation body. The drilling tip 41 has a proximal end extending downwardly from a circular-shaped distal end of the enlarging portion 42 and a point P on a distal end thereof. The outer surface 41s of the drilling tip 41 is shaped such that when the enlarging portion 42 and the drilling tip 41 are viewed in a direction perpendicular to the axis of rotation A, outer edges 41e of the outer surface 41s of the drilling tip 41 on opposite sides of the axis of rotation A are seen to extend from the distal end of the enlarging portion 42 in a steadily downwardly and inwardly curving manner toward the axis of rotation A, and to meet at the point P at the distal end of the drilling tip 41. The circular-shaped proximal end of the enlarging portion 42, which joins an end face 7e of the flange portion 7, has a cross-sectional area at least as large as a cross-sectional area of the stem portion 1a. The drilling tip 41 first drills a hole in the sheet metal element 3, with the bulging outer edges of the outer surface 41s of the drilling tip 41 expanding the hole, and finally, the outer surface 42s of the truncated-conical-shaped enlarging portion 42 widening the hole to the desired diameter (see FIG. 15), wherein the annular wall 43 automatically produces the nozzle 45 of the sheet metal element 3, this, so to speak, killing two birds with one stone, namely, on the one hand, producing the required aperture in the sheet metal element 3 while also producing the nozzle 45 with the annular wall 43, on the inside of which annular wall 43 is then formed the friction-welded connection, represented by the black area 44.

FIG. 16 presents a rotation body 1 which is basically of identical design to the rotation body from FIG. 1. In FIG. 16, however, the counter-pressure face 2 is provided with axially extending grooves 50, of which only one groove is shown in FIG. 16. The axial top plan view of the rotation body 1, looking onto the counter-pressure face 2, as presented in FIG. 17 shows four axial grooves 50, which, upon rotation of the rotation body 1, ensure that any paint or oxide layers can be scraped off or that any abraded material can be collected therein.

FIG. 18 presents a variation on the design of the above-described grooves. In this case, the rotation body 1 is provided in the region of its counter-pressure face 2 with obliquely extending grooves 51. Because of this oblique direction, an outwardly directed impulse is imparted to the dirt particles collected in the groove 51, wherein, depending on the rotation direction, the dirt particles are moved towards the bottom surface 52 of the rotation body or towards the flange 53.

Similarly to FIG. 17, FIG. 19 presents the axial top plan view of the rotation body 1, wherein the counter-pressure face 2 is provided not only with the grooves 50, but also, next to each of the grooves 50, with two adjacent beads 54 which further reinforce the abrasive action of the grooves 50.

FIG. 20 presents a design of the rotation body that has been modified in comparison with the hereinbefore described designs. In this case, the rotation body has the form of a sleeve 55 and is provided on its outside surface with the conical counter-pressure face 56. The connection between the sheet metal element 3 and the sleeve 55 is, as already presented in the above drawings, indicated by the black line 58, where the friction-welded connection has taken place. The sleeve 55 is further provided with the hole 57, said hole 57 serving, for example, to receive a screw.

What is claimed is:

1. Friction-welded connection between a sheet metal element and a therein inserted rotation body, the rotation body comprising:
    a stem portion, a flange portion extending radially from a distal end of the stem portion, and an enlarging portion shaped as a truncated cone and a drilling tip disposed one after the other along an axis of rotation of the rotation body,
    wherein the drilling tip has a proximal end extending downwardly from a circular-shaped distal end of the enlarging portion and a point on a distal end thereof, and
    the outer surface of the drilling tip being shaped such that when the enlarging portion and the drilling tip are viewed in a direction perpendicular to the axis of rotation, outer edges of the outer surface of the drilling tip on opposite sides of the axis are seen to extend from the distal end of the enlarging portion in a steadily downwardly and inwardly curving manner toward the axis of rotation, and to meet at the point at the distal end of the drilling; and
    a nozzle formed by an annular wall of the sheet metal, said nozzle having a friction surface having a shape corresponding to a corresponding area of the truncated-conical shape of an outer surface of the enlarging portion;
    said enlarging portion sits in the nozzle formed by the annular wall of the sheet metal in such a way that positioning of the rotation body exposes an increasing pressure on the annular wall,
    wherein between the rotation body and the nozzle a friction-weld is formed along the outer surface of the enlarging portion and the corresponding shape of the nozzle by the rotation of the rotation body.

2. Friction-welded connection according to claim 1, wherein when the drilling tip is viewed in the direction perpendicular to the axis of rotation, the outer edges of the drilling tip on opposite sides of the axis, between the proximal end of the drilling tip and the point at the distal end of the drilling tip, are seen to bulge outwardly.

3. Friction-welded connection according to claim 1, wherein the circular-shaped proximal end of the enlarging portion, which joins an end face of the flange portion, has a cross-sectional area at least as large as a cross-sectional area of the stem portion.

* * * * *